US012761644B2

(12) United States Patent
Petersen et al.

(10) Patent No.: US 12,761,644 B2
(45) Date of Patent: Oct. 13, 2026

(54) FAULT DETECTION AND DIAGNOSTICS OF BUILDING AUTOMATION SYSTEMS

(71) Applicant: Siemens Industry, Inc., Alpharetta, GA (US)

(72) Inventors: Jake Petersen, Kiel (DE); Florian Koehler, Rimbach (DE); Jan Monica, Kiel (DE)

(73) Assignee: Siemens Aktiengesellschaft, Munich (DE)

( * ) Notice: Subject to any disclaimer, the term of this patent is extended or adjusted under 35 U.S.C. 154(b) by 311 days.

(21) Appl. No.: 18/521,497

(22) Filed: Nov. 28, 2023

(65) Prior Publication Data

US 2025/0172932 A1 May 29, 2025

(51) Int. Cl.
*G05B 23/02* (2006.01)

(52) U.S. Cl.
CPC ..... *G05B 23/0281* (2013.01); *G05B 23/0221* (2013.01)

(58) Field of Classification Search
CPC ............ G05B 23/0281; G05B 23/0275; G05B 23/0259; G05B 23/0205; G05B 23/02; G05B 23/00; G05B 23/0221; G05B 23/0218; G05B 2219/2642; G05B 2219/26; G05B 2219/20; G05B 2219/00; G05B 15/02; G05B 15/00
See application file for complete search history.

(56) References Cited

U.S. PATENT DOCUMENTS

| | | | | |
|---|---|---|---|---|
| 11,480,935 | B2 | 10/2022 | Wang et al. | |
| 2011/0156896 | A1 | 6/2011 | Hoffberg et al. | |
| 2018/0046149 | A1 | 2/2018 | Ahmed | |
| 2021/0109485 | A1* | 4/2021 | Papadopoulos | G06N 3/0895 |
| 2021/0216053 | A1* | 7/2021 | Boelk | G05B 15/02 |
| 2022/0382270 | A1 | 12/2022 | Schuster et al. | |
| 2022/0407597 | A1* | 12/2022 | Amiri | H04B 10/0795 |
| 2023/0206942 | A1* | 6/2023 | Schneider | G01M 15/12 704/200 |
| 2023/0304690 | A1* | 9/2023 | Simmons | F24F 11/32 |
| 2024/0131734 | A1* | 4/2024 | Munir | B25J 19/021 |

OTHER PUBLICATIONS

Muller et al., "Identifying Mislabeled Instances in Classification Datasets", IEEE, 2019, pp. 1-8. (Year: 2019).*

* cited by examiner

*Primary Examiner* — Mohamed Charioui

(57) ABSTRACT

Systems and methods detect and diagnose faults of a building automation system. Timeseries data are received from the building automation system. A label plausibility is determined for each set of timeseries data and the corresponding label associated with the set of timeseries data based on a tree-based classifier and an image transformation classifier. The tree-based classifier and the image transformation classifier receive the same data input and operating distinctly from each other.

18 Claims, 7 Drawing Sheets

FAULT DETECTION AND DIAGNOSTICS OF BUILDING AUTOMATION SYSTEMS

FIELD OF THE INVENTION

This application relates to the field of building systems and, more particularly, to systems and methods for fault detection and diagnostics of building automation systems.

BACKGROUND

Building automation systems encompass a wide variety of systems that aid in the monitoring and control of building operations. In particular, building automation systems detect faults and other error or abnormal conditions in a building automation system. To use data points (e.g., room temperature sensors and pressure sensors) for fault detection, it is important to understand the actual task of a data point within a building, such as one data point for measuring outside air temperature and another data point for measuring supply air temperature.

These tasks of data points are represented by data point labels. For fault detection and diagnostics (FDD) of a building automation system, the system must know the labels of the data points within a building in order to understand its task. This task of labeling is done manually and can be difficult for installation and maintenance personnel. The task is also error prone, especially if the data point names in the building are not standardized. Accordingly, conventional systems fail to determine whether assigned labels adequately characterize data points, resulting in problems with analysis and diagnostics task.

SUMMARY

In accordance with one embodiment of the disclosure, there is provided a label plausibility approach for building automation systems. The approach is independent of naming conventions to check whether data points are understood correctly by the system and labelled accurately. The checking procedure of the label plausibility approach determines whether the designated label of a data point corresponds to its actual task by checking whether the corresponding timeseries data is plausible for that label.

One aspect is a method for fault detection and diagnostics of a building automation system. Timeseries data are received from the building automation system. A label plausibility is determined for each set of timeseries data and the corresponding label associated with the set of timeseries data based on a tree-based classifier and an image transformation classifier. The tree-based classifier and the image transformation classifier receive the same data input and operating distinctly from each other.

Another aspect is a system for fault detection and diagnostics of a building automation system comprising an input component and a processor. The input component receives timeseries data from the building automation system. The processor determines a label plausibility for each set of timeseries data and the corresponding label associated with the set of timeseries data based on a tree-based classifier and an image transformation classifier. The tree-based classifier and the image transformation classifier receive the same data input and operating distinctly from each other.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 2, including

DETAILED DESCRIPTION

Figure 1:
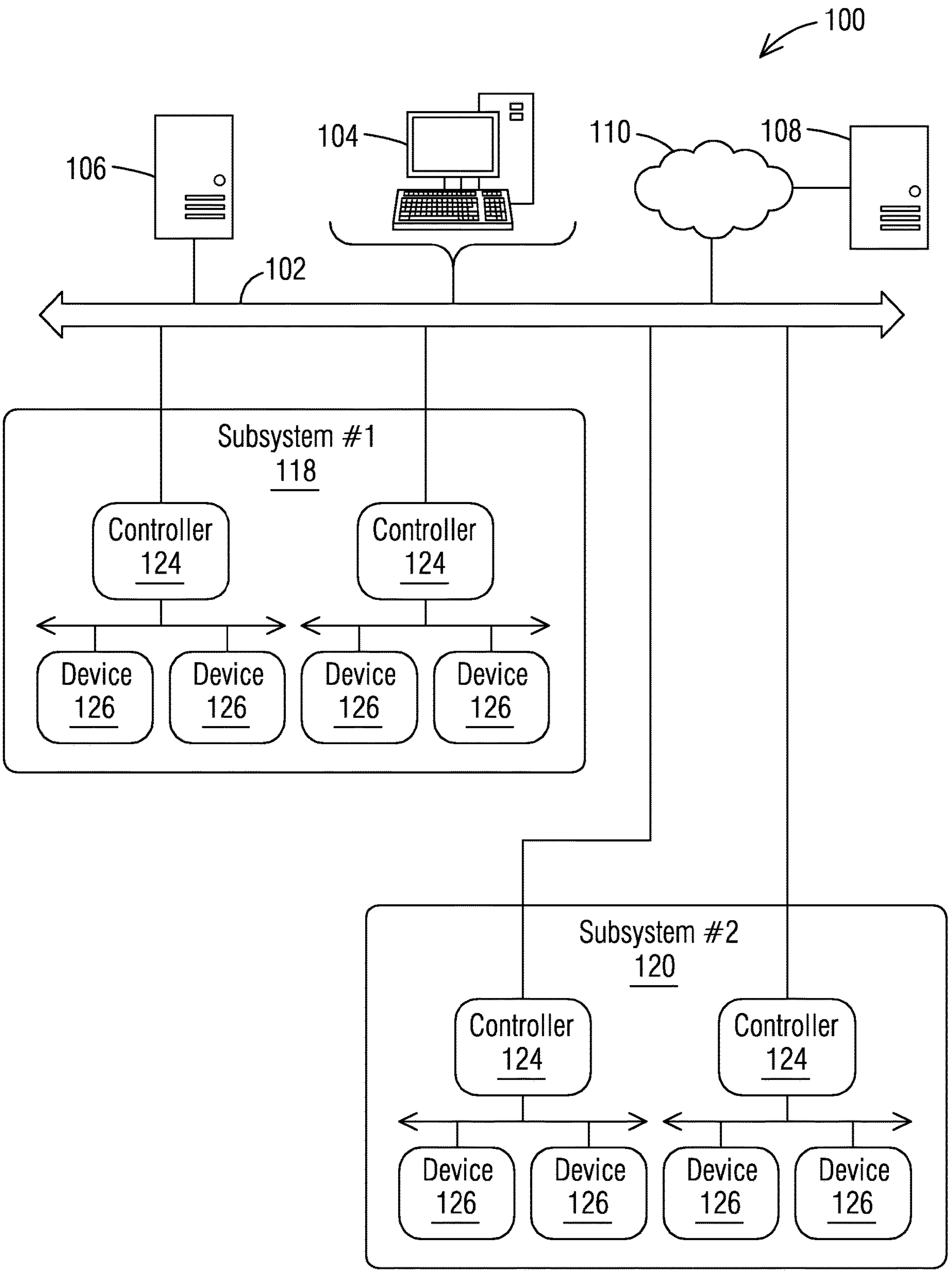
FIG. 1 is a block diagram of a building automation system in an example implementation that is operable to employ techniques described herein.

Various technologies that pertain to systems and methods that facilitate label plausibility checking will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring to FIG. 1, there is shown a block diagram of the building automation system ("BAS" or "system") 100 in an example implementation for the environment. The system 100 comprises one or more network connections or primary buses 102 for connectivity to components of a management level network ("MLN") of the system 100. For one embodiment, the example system 100 may comprise one or more management level devices or management stations, such as a management workstation 104, a management server 106, or a remote management station 108 connecting through a wired or wireless network 110, that allows the setting and/or changing of various controls of the system. A management station 104, 106, 108 may also be a portable management station connecting through a wired or wireless link to an individual automation or field level device of the system 100. While a brief description of the system 100 is provided below, it will be understood that the system described herein is only one example of a particular form or configuration for a system. The system 100 may be implemented in any other suitable manner without departing from the scope of this disclosure. The management stations 104, 106, 108 are configured to provide overall control and monitoring of automation devices, field devices, and other devices of the system 100.

For the illustrated embodiment of FIG. 1, the system 100 provides connectivity based on one or more communication protocols to subsystems for various building parameters, such as components of environmental comfort, fire safety, and security systems. Each subsystem 118, 120 may include various types of automation controllers and field devices 124, 126 ("automation controllers") for monitoring and controlling areas within a building or group of buildings. Examples of automation controllers and field devices 124, 126 include, but are not limited to, actuators, field panels, sensors, third-party devices, and the like. These automation controllers and field devices 124, 126 may communicate via one or more communication protocols, such as BACnet, KNX, Lon Works, Modbus, and the like.

Figure 2A:
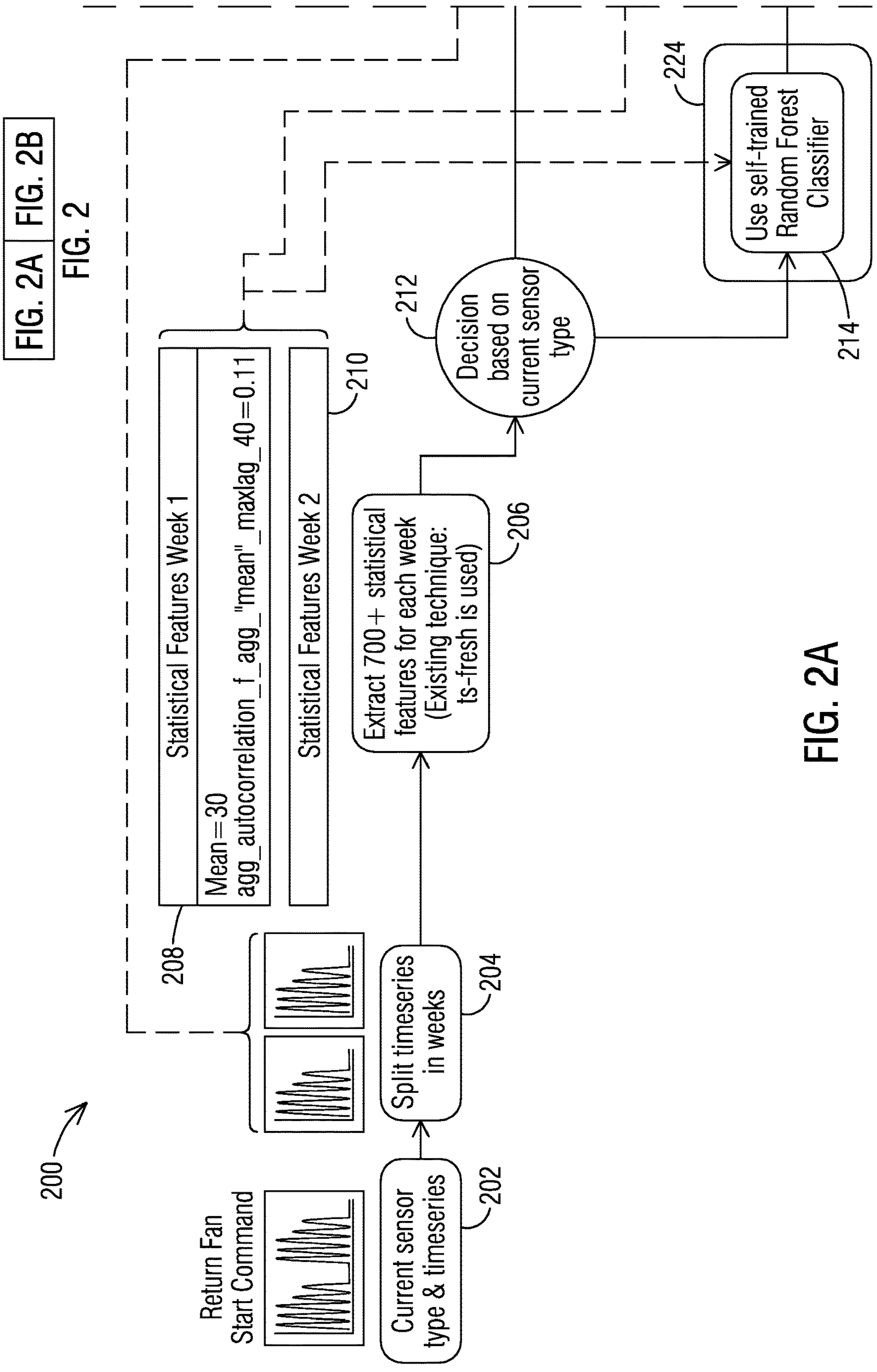
FIGS. 2A and 2B, is a flow diagram representing an operation, in an example implementation, of the building automation system of FIG. 1.
Figure 2B:
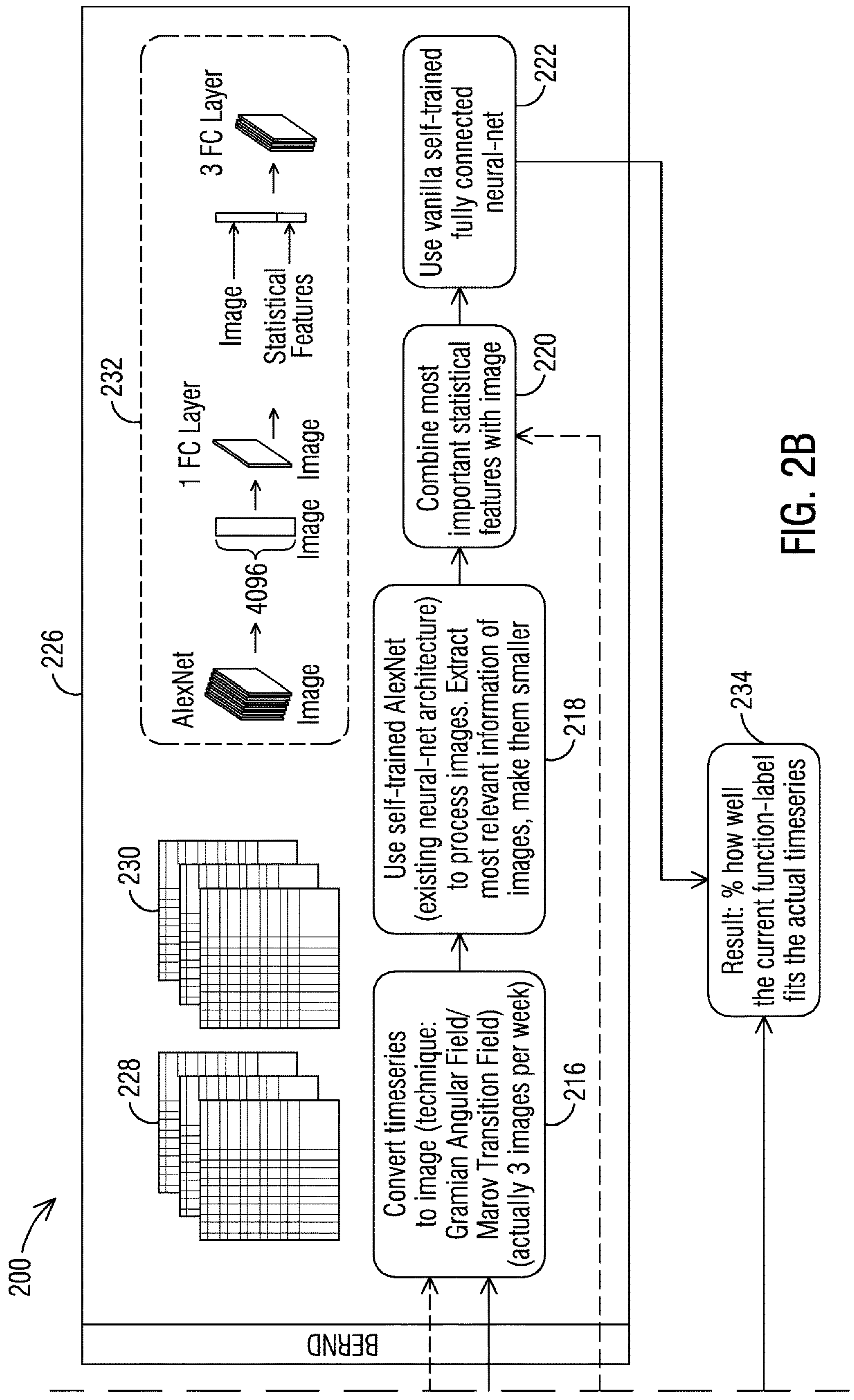

Referring to FIG. 2, including FIGS. 2A and 2B, is a flow diagram representing an operation 200, in an example implementation, of the building automation system 100. For this operation 200, a label plausibility checker automatically analyzes timeseries data of each data point and checks the label corresponding to the data point. For some embodiments, the operation 200 may be executed by a system based on a statistical model or a machine learning system based on artificial intelligence. For example, the machine learning system trains two models to learn how a timeseries of a certain type of data point looks like. The two models are the three-based model and an image-transformation model that uses a CNN coupled with statistical information in a fully connected neural network. Each classifier is trained on timeseries data of a first portion (such as 50%) of the inputted sensory type (such as room temperature) and a second portion (such as 50%) of other timeseries data of different sensor types. The classifier then checks if the inputted timeseries fits to the label that is currently assigned or if it rather fits to one of the timeseries in the "other" class.

The operation 200 represents a method for fault detection and diagnostics of the building automation system 100. A processor, which may include cooperative processors, of the management station 104, 106, 108 receive (202) timeseries data from one or more field devices 124, 126 of the building automation system 100. For some embodiments, the management station 104, 106, 108 may parse (204) the timeseries data into predetermined time periods, such as time periods associated with a calendar period type (days, weeks, months, years, etc.). For some embodiments, the operation 200 may extract (206) statistical features for the timeseries data. For example, hundreds of statistical features 208, 210 for each individual time period of the predetermined time periods may be extracted. For some embodiments, the processor of the management station 104, 106, 108 may identify (212) a data type associated with one or more field devices of the building automation system. For example, the data type may be determined based on the type of field device providing the timeseries data. Often, the data types may be determined by a manual process that sometimes results in wrong labels that the operation would like to detect.

In response to receiving (202) the timeseries data, the processor of management station 104, 106, 108 determines (214, 216, 218, 220, 222) a label plausibility for each set of timeseries data and the corresponding label associated with the set of timeseries data. The operation 200 determine the label plausibility based on multiple classifiers including a tree-based classifier 224 and an image transformation classifier 226. The tree-based classifier 224 and the image transformation classifier 226 receive the same data input and operating distinctly from each other. In this manner, the management station 104, 106, 108 operates two separate subprocesses 224, 226 that are orchestrated, and thus combined, to determine the label plausibility. The subprocesses 224, 226 are orchestrated to one ensemble algorithm.

As stated above, the subprocesses include the tree-based classifier 224 and the image transformation classifier 226. Based on the tree-based classifier 224, the processor of the management station 104, 106, 108 determines the label plausibility by, in part, generating (214) a first probability corresponding to an association between each set of timeseries data and the corresponding label. For example, the first probability may indicate a probability of how well the label fits the corresponding timeseries data. For some embodiments, the tree-based classifier may be a random forest classifier in which the statistical features 208, 210 may serve as inputs to the random forest classifier. The result of the tree-based classifier is a first probability associated with how well the timeseries data corresponds to the currently assigned label. For some embodiments, if the first probability is low, then the label of the datapoint may be wrong or some abnormal behavior may be exhibited. The first probability may be determined to be low if the probability fails to exceed a predetermined first probability threshold.

Based on the image transformation classifier 226, the processor of the management station 104, 106, 108 determines the label plausibility by, in part, generating (216-222) a second probability corresponding to an association between each set of timeseries data and the corresponding label. For example, the second probability of how well the label fits the corresponding timeseries data. The management station 104, 106, 108 may initiate generation (216-222) of the second probability by transforming (216) each set of timeseries data to an RGB image 228, 230. In response to transforming (216) to timeseries data, the management station 104, 106, 108 performs imaging processing 232 to process the transformed images at various stages (218-222) of generating (216-222) the second probability. In particular, when generating (216-222) the second probability, the management station 104, 106, 108 applies (218, 222) one or more neural networks to the transformed RGB images. For some embodiments, the neural networks include a convolutional neural network (CNN) and, thereafter, a multi-layer perceptron. For example, the CNN may be built on an Alexnet architecture and extract the most relevant information of the images (218). The result of this process is some kind of image, that we are combining with the most important statistical features (220). This image may be made to one flat vector and used in a multi-layer-perceptron. For some embodiments, the management station 104, 106, 108 may combine (220) one or more statistical features with each transformed RGB image. For some embodiments, the image transformation classifier includes data preprocessing of a Markov-Transition-Field transformation, a Gramian-Angular-Field transformation, or both.

The processor of the management station 104, 106, 108 determines the label plausibility by determining (234) the label plausibility based on a first probability of the tree-based classifier and a second probability of the image transformation classifier. The label plausibility may be represented in various ways indicating how well the current function label corresponds to the actual timeseries data. For example, the label plausibility may include a percentage or ratio representing how well each label associates with the timeseries data corresponding to the label. In response to determining (214, 216, 218, 220, 222) the label plausibility, the processor of the management station 104, 106, 108 may initiate a process to modify one or more labels based on the label plausibility, output the label plausibility at an output device, send the label plausibility information to a remote device, and the like.

The operation 200 for the label plausibility checker automatically analyzes the incoming timeseries data and checks the corresponding label using a statistical model or a machine learning system based on artificial intelligence. For a machine learning system, a classifier may be trained to learn how a timeseries of a certain data type may appear. Subsequent to training, the system may check timeseries data during operation to determine whether the data fits the learned pattern. Accordingly, each of the tree-based classifier and the image transformation classifier may be trained to identify the pattern associated each set of timeseries data and the corresponding label, for a particular data type. For some embodiments, the classifiers may be trained by inputting positive examples and negative examples to the classifier. For example, the positive examples may include data points of the same label and the negative examples may include data points of different labels.

Both classifiers or models may be pretrained on a subset of all available datapoints of the building automation system, which may be associated with one, multiple, or all buildings. The classifiers learn the appropriate positive and negative examples of timeseries data for each designated label. Each classifier learns to differentiate the current label of a set of data points from all other labels and learned how a typical timeseries of the label should correspond. Since we got 193 different types of sensors, we also got 193 labels. A separate classifier has been trained for each type of data point so different classifiers are used for the tree-based classifier 224 and the image transformation classifier 226.

Figure 3:
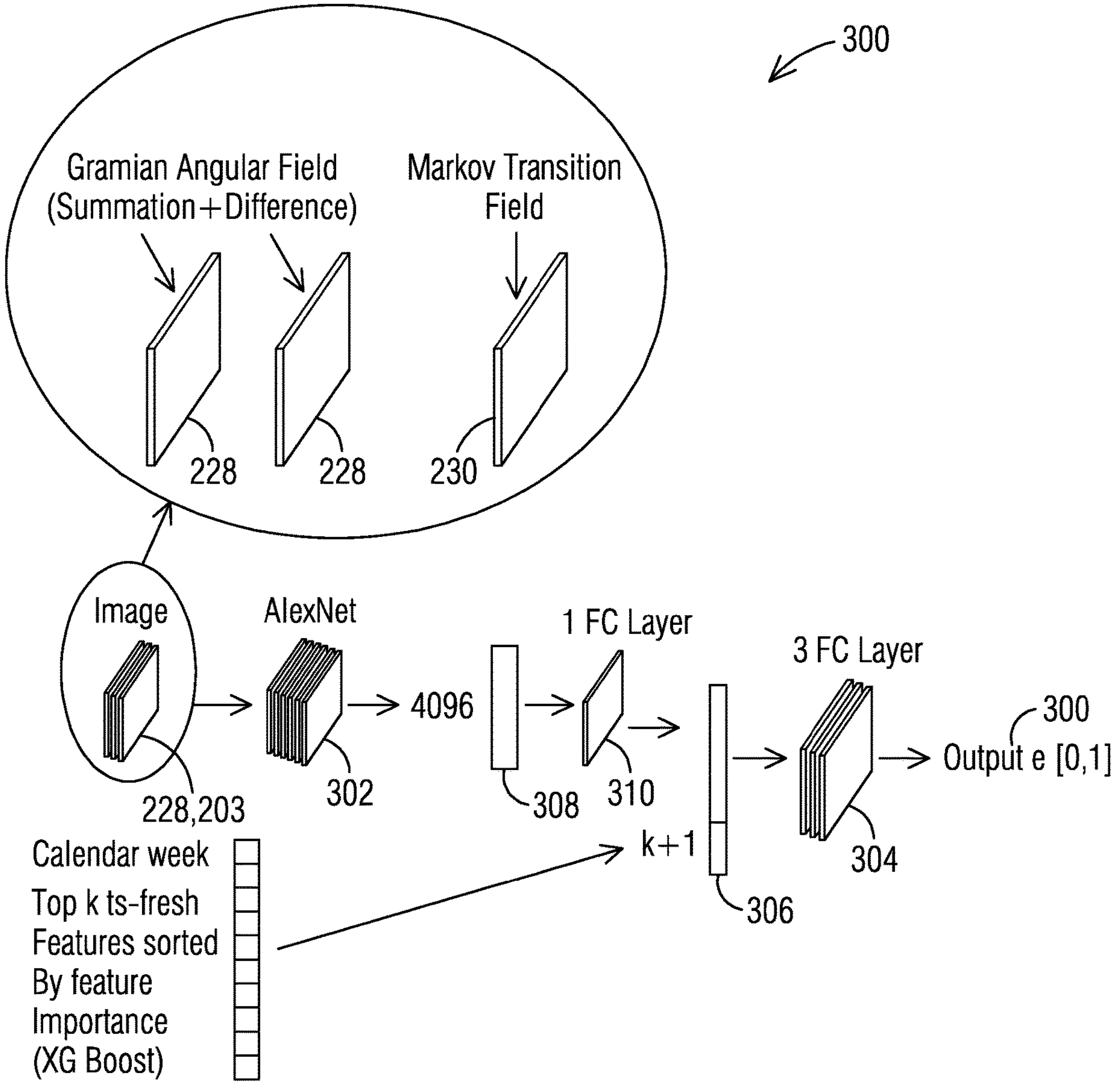
FIG. 3 is a close-up view of the image transformation sub-operation of the example operation of FIG. 1.

Referring to FIG. 3 is a close-up view 300 of the image transformation classifier 226 for image processing 232 of the example operation 200. The processor of the management station 104, 106, 108 may initiate generation (216-222) of the second probability by transforming (216) each set of timeseries data to an RGB image 228, 230. The RGB images may include Gramian angular field 228 and Markov transition field images 230, both of which are obtained from timeseries data. Each Gramian angular field image 228 represents a temporal correlation between each pair of values, represented in a polar coordinate system (as opposed to Cartesian coordinates). Each Markov transition field image 230 represents a field of transition probabilities for a discretized timeseries, representing the relation between arbitrary points in the timeseries data.

In response to transforming (216) to timeseries data, the management station 104, 106, 108 performs image processing 232 to process the transformed images at various stages (218-222) of generating (216-222) the second probability. In particular, when generating (216-222) the second probability, the operation applies (218, 222) one or more neural networks to the transformed RGB images. For some embodiments, the neural networks include a Convolutional Neural Network (CNN) and, thereafter, a multi-layer perceptron. For example, one neural network may be a CNN with Alexnet-like architecture. For some embodiments, the CNN 302, based on a pretrained Alexnet architecture, may be combined with a Multi-Layer Perceptron 304 to get a percentage how plausible the label is for this datapoint. For some embodiments, the management station 104, 106, 108 may combine (220) one or more statistical features 306 with each transformed RGB image. For such embodiments, the images 228, 230 of each set of timeseries data may correspond to neural network output 308 and a fully connected layer 310. Then, the most important statistical features 306 may be combined with the image and multiple fully connected layers 304 may be formed. The fully connected layers 304 operate on a flattened input where each input is connected to all neurons, which may be used to optimize objectives 312.

Figure 4:
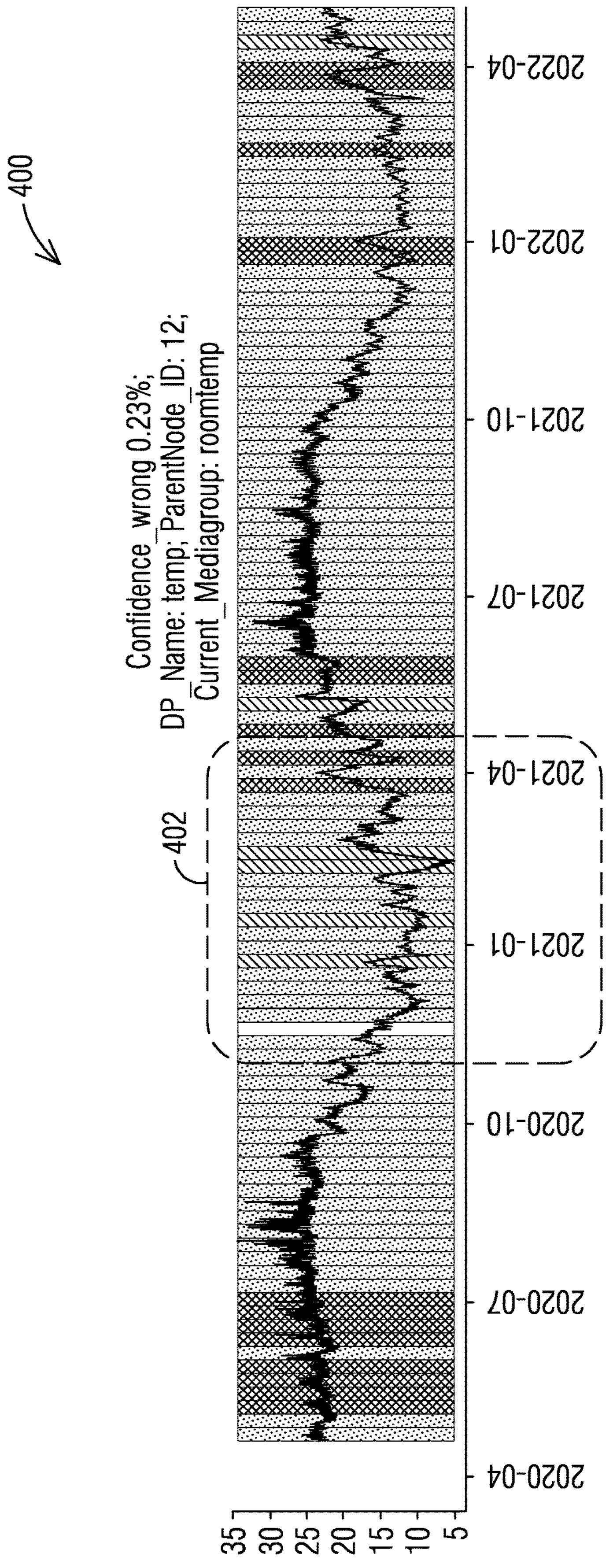
FIGS. 4 and 5 are graphical illustrations of label plausibility results, in example implementations, generated by the operation of FIG. 2.
Figure 5:
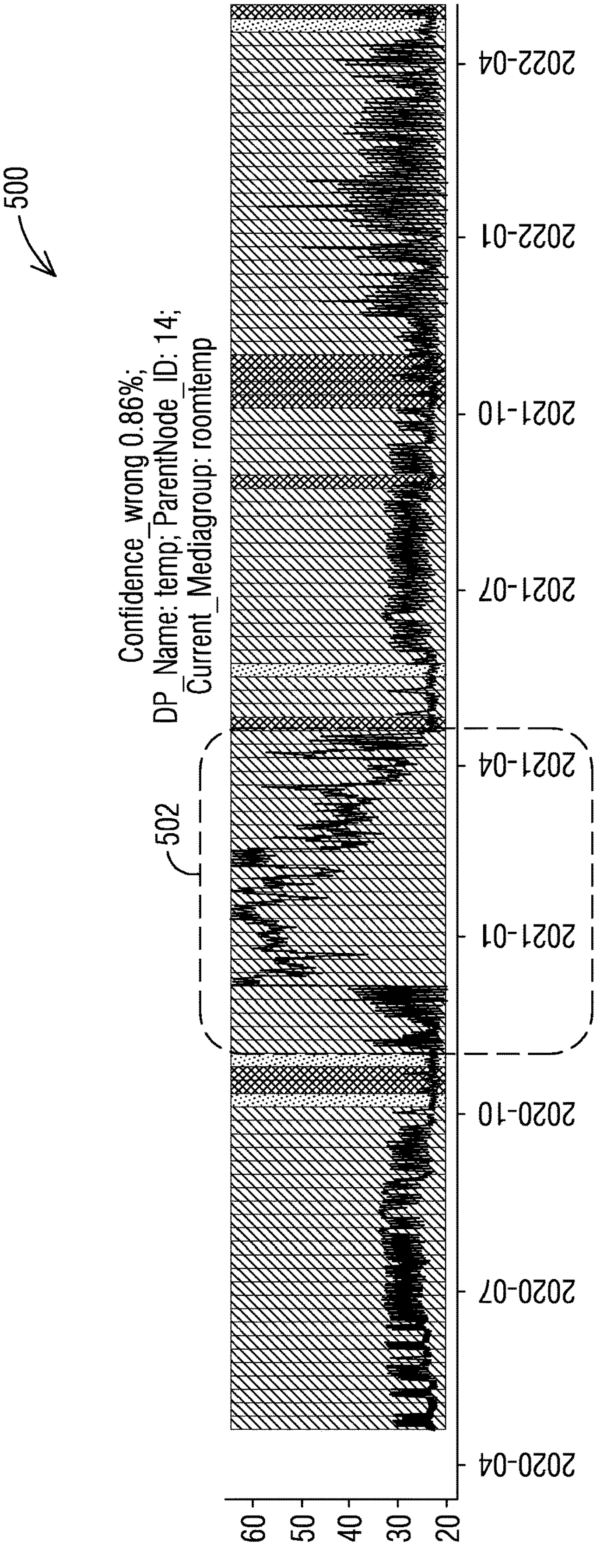

Referring to FIGS. 4 and 5, there are shown graphical illustrations 400, 500 of label plausibility results, in example implementations, generated by the operation. The trained classifiers 224, 226 are used to predict the plausibility of the labels for a given data point. In production, the timeseries data for the data points are received, processed, and used for inference. As shown in FIGS. 4 and 5, the results of the operation 200 of the system 100 are represented by a visualization where each timestamp is color coded. For example, a given period of time 402, 502 associated with the received timeseries data may be divided into multiple time periods, such as one-week snippets. The time periods indicating a high probability of a wrong label may be color coded as a first color (such as red), a medium probability of a wrong label may be color coded as a second color (such as yellow), and a low probability of a wrong label may be color coded as a third color (such as green). For FIG. 4, many parts of the timeseries data are marked in the third color, so the results indicate that the current label (such as room temperature) is correct. Some parts of the timeseries data are marked in the first color, e.g., in February. For example, the room temperature dropped down to 5 degrees Celsius (41 Fahrenheit), which may not be considered a normal room temperature. In contrast to FIG. 4, FIG. 5 shows timeseries data are marked in the first color, so the results indicate that the current label is not correct.

Figure 6:
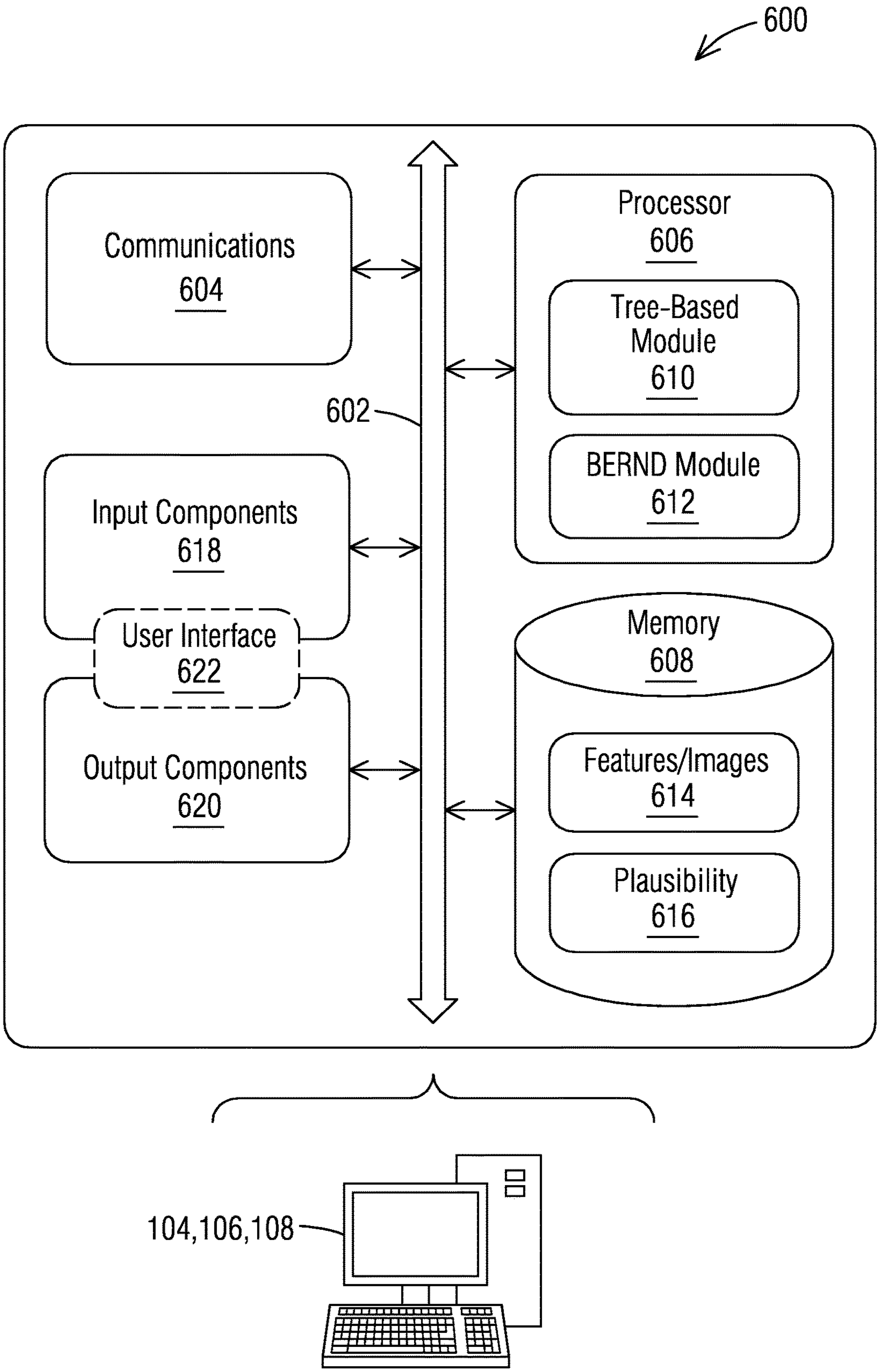
FIG. 6 is a block diagram of example components 600 of a management station for the building automation system of FIG. 1.

Referring to FIG. 6, there is shown example components 600 of a management station 104, 106, 108 for a building automation system. The device components 600 comprise one or more communication lines 602 for interconnecting other device components directly or indirectly. The other device components include one or more communication components 604 communicating with other entities via a wired or wireless network, one or more processors 606, and one or more memory components 608. The communication component 604 communicates (i.e., receives and/or transmits) data associated with one or more devices of the system 100 and its associated devices, such as the field devices and the other management devices. The communication component 604 may utilize wired or wireless technology for communication. Examples of wireless communication technologies include, but are not limited to, Bluetooth (including BLE), ultrawide band (UWB), Wi-Fi (including Wi-Fi Direct), Zigbee, cellular, mesh networks, PAN, WPAN, WAN, near-field communications, and other types of radio communications and their variants.

The processor or processors 606 may send data to, and process commands received from, other components of the device components 600, such as information of the communication component 604 or the memory component 608. Each application includes executable code to provide specific functionality for the processor 606 and/or remaining components of the management device 104, 106, 108. Examples of applications executable by the processor 606 include, but are not limited to, a tree-based module 610 and a BERND module 612.

Data stored at the memory component 608 is information that may be referenced and/or manipulated by a module of the processor 606 for performing functions of the management stations 104, 106, 108. Examples of data associated with the management station 104, 106, 108 and stored by the memory component 608 may include, but are not limited to, statistical features and images 614 and plausibility data 616.

The device components 600 may include an input component 618 that manages one or more input components and/or an output component 620 that manages one or more output components. The input components 618 and output components 620 of the device components 600 may include one or more visual, audio, mechanical, and/or other components. For some embodiments, the input and output components 618, 620 may include a user interface 622 for interaction with a user of the device. The user interface 622 may include a combination of hardware and software to provide a user with a desired user experience.

It is to be understood that FIG. 6 is provided for illustrative purposes only to represent an example implementation of the management station 104, 106, 108 and is not intended to be a complete diagram of the various components that may be utilized by the device. The device management station 104, 106, 108 may include various other components not shown in FIG. 6, may include a combination of two or more components, or a division of a particular component into two or more separate components, and still be within the scope of the present invention. Also, the components 600 may be coupled directly or indirectly to each other to perform the operations of the device management station 104, 106, 108. For example, the processor 606 may be coupled, directly or indirectly, to the input component 618. Likewise, the output component 620 may be coupled, directly or indirectly, to the processor 606.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A method for fault detection and diagnostics of a building automation system comprising:

receiving, by a processor of a management station of the building automation system communicating with one or more field devices via one or more communication protocols, timeseries data from the building automation system;

determining a label plausibility for each set of timeseries data and the corresponding label associated with the set of timeseries data based on a tree-based classifier and an image transformation classifier, the tree-based classifier and the image transformation classifier receiving the same data input and operating distinctly from each other, wherein the image transformation classifier determines the label plausibility in part by transforming each set of timeseries data to an RGB image comprising at least one of a Gramian angular field image or a Markov transition field image, and wherein determining the label plausibility comprises determining the label plausibility based on a first probability of the tree-based classifier and a second probability of the image transformation classifier, the label plausibility including a percentage or ratio representing how well each label associates with the timeseries data corresponding to the label; and modifying a control parameter of a building equipment based on the determined label plausibility, wherein modifying the control parameter comprises modifying one or more labels associated with data points of the one or more field devices based on the label plausibility.

2. The method as described in claim 1, further comprising:

parsing the timeseries data into a plurality of predetermined time periods, the plurality of predetermined time periods being associated with a calendar period type;

extracting a plurality of statistical features for the timeseries data; and identifying a data type associated with one or more field devices of the building automation system.

3. The method as described in claim 1, wherein determining the label plausibility comprises:

generating, based on the tree-based classifier, a probability corresponding to an association between each set of timeseries data and the corresponding label.

4. The method as described in claim 3, wherein:

the tree-based classifier is a random forest classifier; and generating the probability includes determining that a particular label of the data point is wrong or exhibits abnormal behavior based on the probability failing to exceed a predetermined threshold.

5. The method as described in claim 1, wherein determining the label plausibility comprises:

generating, based on the image transformation classifier, a probability corresponding to an association between each set of timeseries data and the corresponding label, generating the probability including transforming each set of timeseries data to an RGB image.

6. The method as described in claim 5, wherein generating the probability comprises:

applying at least one neural network to the transformed RGB images, the at least one neural network including a CNN and a multi-layer perceptron; and combining at least one statistical feature with each transformed RGB image.

7. The method as described in claim 1, wherein the image transformation classifier includes data preprocessing of at least one of Markov-Transition-Field transformation or Gramian-Angular-Field transformation.

8. The method as described in claim 1, further comprising:

modifying one or more labels based on the label plausibility.

9. The method as described in claim 1, further comprising:

training each of the tree-based classifier and the image transformation classifier to identify a pattern associated with each set of timeseries data and the corresponding label, for a particular data type, wherein training each classifier includes inputting positive examples and negative examples to the classifier, the positive examples including data points of the same label and the negative examples including data points of different labels.

10. A system for fault detection and diagnostics of a building automation system comprising:

a management station communicating with one or more field devices of the building automation system via one or more communication protocols;

an input component of the management station configured to receive timeseries data from the one or more field devices of the building automation system; and a processor of the management station configured to determine a label plausibility for each set of timeseries data and the corresponding label associated with the set of timeseries data based on a tree-based classifier and an image transformation classifier, the tree-based classifier and the image transformation classifier receiving the same data input and operating distinctly from each other, wherein the processor determines the label plausibility based on a first probability of the tree-based classifier and a second probability of the image transformation classifier, the label plausibility including a percentage or ratio representing how well each label associates with the timeseries data corresponding to the label, and wherein the processor modifies a control parameter of a building equipment based on the determined label plausibility, wherein modifying the control parameter comprises modifying one or more labels associated with data points of the one or more field devices based on the label plausibility.

11. The system as described in claim 10, wherein the processor:

parses the timeseries data into a plurality of predetermined time periods, the plurality of predetermined time periods being associated with a calendar period type;

extracts a plurality of statistical features for the timeseries data; and identifies a data type associated with one or more field devices of the building automation system.

12. The system as described in claim 10, wherein the processor generates, based on the tree-based classifier, a probability corresponding to an association between each set of timeseries data and the corresponding label.

13. The system as described in claim 12, wherein:

the tree-based classifier is a random forest classifier; and the processor determines that a particular label of the data point is wrong or exhibits abnormal behavior based on the probability failing to exceed a predetermined threshold.

14. The system as described in claim 10, wherein the processor generates, based on the image transformation classifier, a probability corresponding to an association between each set of timeseries data and the corresponding label, generating the probability including transforming each set of timeseries data to an RGB image.

15. The system as described in claim 14, wherein the processor:

applies at least one neural network to the transformed RGB images, the at least one neural network including a CNN and a multi-layer perceptron; and combines at least one statistical feature with each transformed RGB image.

16. The system as described in claim 10, wherein the image transformation classifier includes data preprocessing of at least one of Markov-Transition-Field transformation or Gramian-Angular-Field transformation.

17. The system as described in claim 10, wherein the processor modifies one or more labels based on the label plausibility.

18. The system as described in claim 10, wherein:

the processor trains each of the tree-based classifier and the image transformation classifier to identify a pattern associated with each set of timeseries data and the corresponding label, for a particular data type; and the processor trains each classifier by inputting positive examples and negative examples to the classifier, the positive examples including data points of the same label and the negative examples including data points of different labels.

* * * * *